United States Patent
Sarkar et al.

(10) Patent No.: US 9,313,263 B2
(45) Date of Patent: Apr. 12, 2016

(54) ASSIGNMENT OF APPLICATIONS IN A VIRTUAL MACHINE ENVIRONMENT BASED ON DATA ACCESS PATTERN

(71) Applicant: VMWARE, INC., Palo Alto, CA (US)

(72) Inventors: Prasenjit Sarkar, Bangalore (IN); Vineet Kumar Sinha, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 164 days.

(21) Appl. No.: 14/166,889

(22) Filed: Jan. 29, 2014

(65) Prior Publication Data

US 2015/0172210 A1   Jun. 18, 2015

(30) Foreign Application Priority Data

Dec. 16, 2013   (IN) .......................... 5869/CHE/2013

(51) Int. Cl.
*H04L 29/08* (2006.01)
*G06F 3/06* (2006.01)

(52) U.S. Cl.
CPC ............... *H04L 67/10* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 5,394,382 A * | 2/1995 | Hu ..................... | G11B 20/1258 |
| | | | 360/73.03 |
| 7,941,625 B2 * | 5/2011 | Sakaguchi ............ | G06F 3/0605 |
| | | | 711/162 |
| 8,082,231 B1 * | 12/2011 | McDaniel ........... | G06F 11/1453 |
| | | | 707/681 |
| 2003/0090980 A1 * | 5/2003 | Kashihara ............ | G11B 7/0062 |
| | | | 369/53.31 |
| 2004/0088504 A1 * | 5/2004 | Hsu ....................... | G06F 3/0613 |
| | | | 711/158 |
| 2005/0138265 A1 * | 6/2005 | Nguyen ............... | G11B 27/105 |
| | | | 711/4 |
| 2005/0144332 A1 * | 6/2005 | Nellitheertha ........ | G06F 9/4881 |
| | | | 710/15 |
| 2006/0020749 A1 * | 1/2006 | Waldvogel ............. | G06F 3/061 |
| | | | 711/112 |
| 2007/0064337 A1 * | 3/2007 | Aoki ................... | G11B 7/08505 |
| | | | 360/78.04 |
| 2007/0198750 A1 * | 8/2007 | Moilanen .............. | G06F 9/5083 |
| | | | 710/6 |
| 2007/0255844 A1 * | 11/2007 | Shen ....................... | H04L 12/00 |
| | | | 709/231 |
| 2008/0062562 A1 * | 3/2008 | Kaneko ................. | G11B 27/32 |
| | | | 360/135 |
| 2008/0082777 A1 * | 4/2008 | Sakaguchi ............ | G06F 3/0605 |
| | | | 711/170 |
| 2008/0320217 A1 * | 12/2008 | Levine .................. | G06F 3/0611 |
| | | | 711/112 |
| 2010/0050008 A1 * | 2/2010 | Allalouf .................... | G06F 1/32 |
| | | | 713/340 |
| 2013/0297922 A1 * | 11/2013 | Friedman .................. | G06F 8/63 |
| | | | 713/2 |
| 2014/0350910 A1 * | 11/2014 | Talwadker .......... | G06F 17/5009 |
| | | | 703/21 |
| 2014/0351505 A1 * | 11/2014 | Chiu ....................... | G06F 3/061 |
| | | | 711/114 |
| 2014/0365732 A1 * | 12/2014 | Sivasubramanian | G06F 12/0862 |
| | | | 711/137 |

* cited by examiner

*Primary Examiner* — Ninos Donabed

(57) ABSTRACT

Techniques for assigning applications to datastores in a virtual machine environment are disclosed. In an embodiment, applications exhibiting different I/O data access patterns are assigned to datastores by collecting data related to the input-output operations performed by the applications, analyzing the collected data to identify corresponding data access patterns, and assigning applications to datastores based on the identified data access patterns. In this way, applications can be segregated by data access pattern onto separate datastores. For example, random I/O apps and sequential I/O apps can be assigned to different datastores. Additionally, if random I/O apps are found to be comingled with sequential I/O apps on the same datastore, then data associated with the applications can be migrated as necessary to achieve segregation. In an embodiment, random I/O apps and sequential I/O apps are segregated onto datastores that rotate independent of each other.

9 Claims, 9 Drawing Sheets

ASSIGNMENT OF APPLICATIONS IN A VIRTUAL MACHINE ENVIRONMENT BASED ON DATA ACCESS PATTERN

BACKGROUND

Computer virtualization is a technique that involves encapsulating a physical computing machine platform into a virtual mach mine that is executed under the control of virtualization software running on a single hardware computing platform (also referred to herein as a "host computing device" or "host computer"). A group of hardware computing platforms may be organized as a cluster to provide the hardware resources for virtual machines (VMs). In a distributed computer system that employs VMs, it is common to have hundreds, even thousands, of VMs running on multiple clusters of host computing devices. Additionally, because the VMs are virtual entities, VMs can easily be moved, added, or removed from a virtual machine environment, which results in an ever changing and evolving virtual machine environment.

In a virtual machine environment, various processes running on the VMs, including individual applications running on each VM, generate data that is stored in a datastore cluster. In the case of applications, each application typically has a characteristic data access pattern which is a function of the type of data operations executed by the application. For example, a highly transactional database application may exhibit a random I/O data access pattern while a file server application, may exhibit a sequential I/O data access pattern.

Data in a datastore cluster can be distributed amongst one or more different datastores within the cluster. Each datastore can be a virtual or physical entity that is used by multiple different applications and/or multiple different VMs. Because different data access techniques can be employed by different applications and because multiple VMs can be assigned to the same datastore, applications employing different data access techniques can be assigned to the same datastore. However, it has been observed that assigning applications exhibiting random I/O access patterns to the same datastore as applications exhibiting sequential I/O access patterns can lead to a, decrease in the overall performance of the associated VMs and their associated applications.

To efficiently manage application performance in a virtual machine environment, it is desirable to avoid comingling of applications using random I/O data access techniques with applications using sequential I/O data access techniques on the same datastore. However, because virtual machine environments can include hundreds, even thousands of VMs and because virtual machine environments tend to be dynamic in nature, it is difficult to manually track and efficiently assign VMs and their applications to datastores in a way that avoids comingling of applications that utilize different data access techniques on the same datastore.

SUMMARY

Techniques for assigning applications to datastores in a virtual machine environment are disclosed. In an embodiment, applications exhibiting different I/O data access patterns are assigned to datastores by collecting data related to the input-output operations performed by the applications, analyzing the collected data to identify corresponding data access patterns, and assigning applications to datastores based on the identified data access patterns. In this way, applications can be segregated by data access pattern onto separate datastores. For example, random I/O apps and sequential I/O apps can be assigned to different datastores.

Additionally, if random I/O apps are found to be comingled with sequential I/O apps on the same datastore, then data associated with the applications can be migrated as necessary to achieve segregation. In an embodiment, random I/O apps and sequential I/O apps are segregated onto datastores that rotate independent of each other.

In an embodiment, a non-transitory computer-readable storage medium that includes instructions for assigning applications to datastores in a virtual machine environment is disclosed. The instructions cause a processor to collect data related to I/O operations for multiple different applications during execution of the multiple different applications. The data is analyzed to identify the data access patterns for the multiple different applications. The multiple different applications are then assigned to datastores based on the data access pattern that corresponds to each of the multiple different applications. In an embodiment, the applications are migrated to their assigned datastores in a manner that segregates the applications by data access pattern.

In another embodiment, a system for assigning applications to datastores in a virtual machine environment is disclosed. The system includes a data collection engine configured to collect data related to input-output operations for multiple different applications during execution of the multiple different applications. The system also includes a data analysis engine configured to analyze the input-output operations data for the multiple different applications to identify data access patterns for the multiple different applications. The system also includes an assignment engine configured to assign the multiple different applications to datastores based on the data access pattern that corresponds to each of the multiple different applications.

In another embodiment, a method for assigning applications to datastores in a virtual machine environment is disclosed. The method involves collecting data related to input-output operations for multiple different applications during execution of the multiple different applications. The method also involves analyzing the input-output operations data for the multiple different applications to identify data access patterns for the multiple different applications. The method also involves assigning the multiple different applications to datastores based on the data access pattern that corresponds to each of the multiple different applications.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
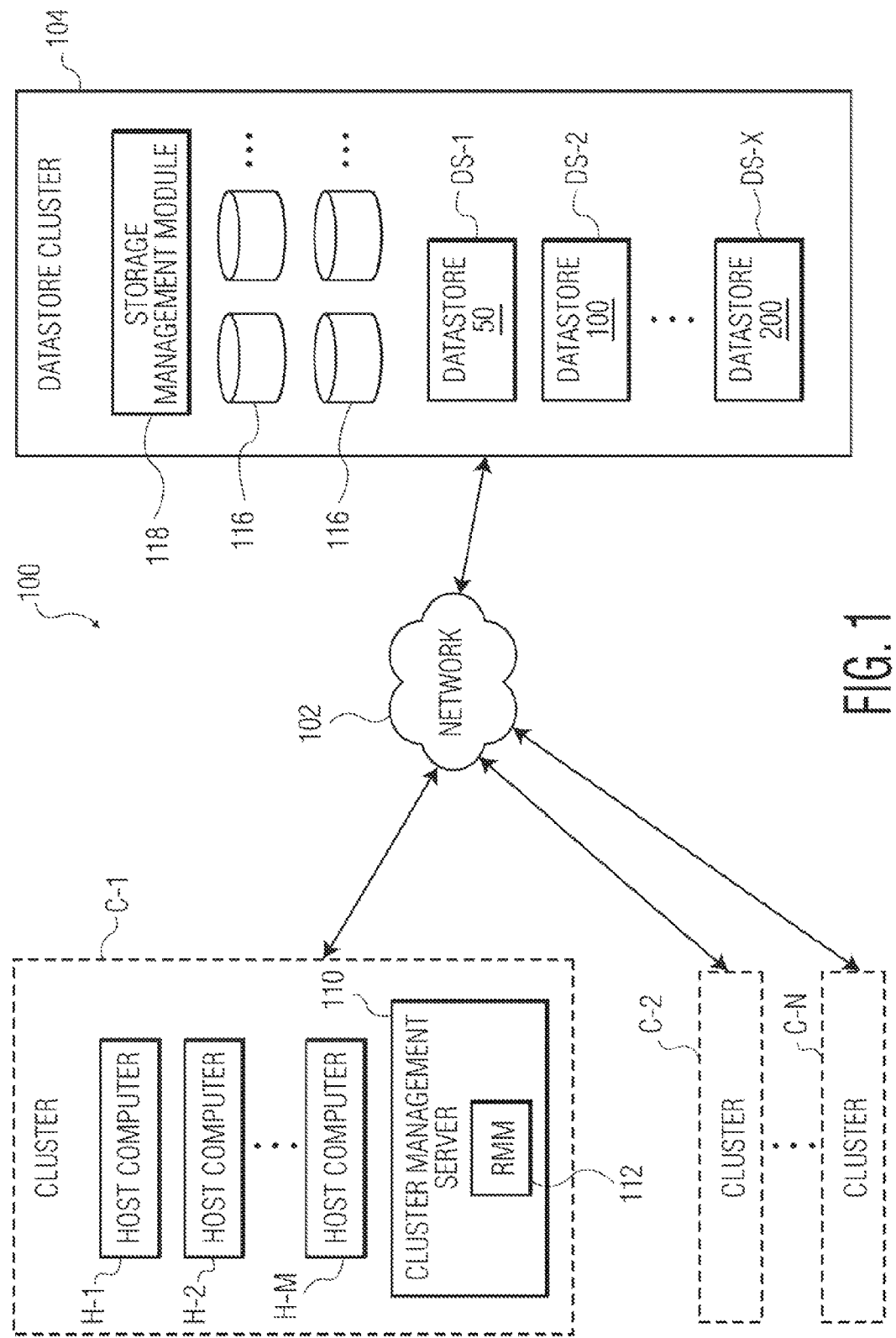
FIG. 1 is a block diagram of a distributed computer.

Turning now to FIG. 1, a distributed computer system 100 is shown. The distributed computer system, referred to as a "virtual machine environment," includes a network 102, clusters C-1, C-2 . . . C-N (where N is a positive integer) of host computers, and storage datastore cluster 104. The exact number of host computer clusters included in the distributed computer system can be from a few clusters to tens of clusters or more. The host computers of the different clusters and the datastore cluster are connected to the network. Thus, each of the host computers in the clusters is able to access the datastore cluster via the network and may share resources provided by the datastore cluster with the other host computers. Consequently, any process running on any of the host computers may also access the datastore cluster via the network.

In the illustrated embodiment, each of the clusters C-1, C-2 . . . C-N includes a number of host computers H-1, H-2 . . . H-M (where M is a positive integer) and a cluster management server 110 with a resource management module (RMM) 112. The number of host computers included in each of the clusters can be any number from one to several hundred or more. In addition, the number of host computers included in each of the clusters can vary so that different clusters can have a different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 2:
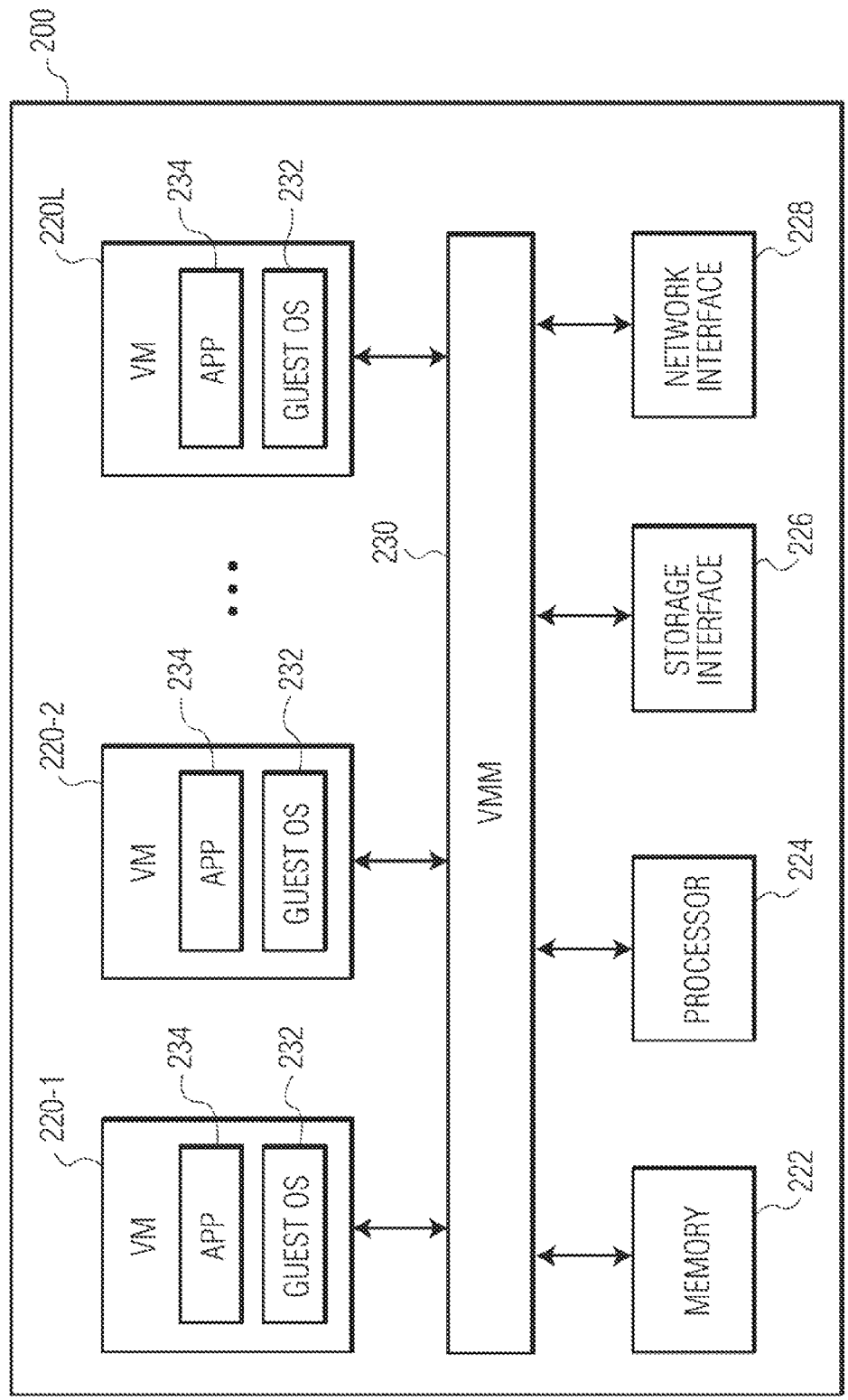
FIG. 2 is a block diagram of a host.

Turning now to FIG. 2, components of a host computer 200 that is representative of the host computers H-1, 1-1-2 . . . H-M are shown. In FIG. 2, the physical connections between the various components of the host computer are not illustrated. In the illustrated embodiment, the host computer is configured to support a number of clients 220-1, 220-2 . . . 220-L (where L is a positive integer) which are VMs. The number of VMs supported by the host computer can be anywhere from one to more than one hundred. The exact number of VMs supported by the host computer is only limited by the physical resources of the host computer. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows that host computer to communicate with, for example, the datastore cluster 104. As an example, the storage interface may be a host bus adapter or a network file system interface. The network interface 228 is an interface that allows the host computer to communicate with other devices in the cluster as well as devices connected to the network 102. As an example, the network interface may be a network adapter.

In the illustrated embodiment, the VMs 220-1, 220-2 . . . 220-L run on top of a virtual machine monitor 230, which is a software interface layer that enables sharing of the hardware resources of the host computer 200 by the VMs. However, in other embodiments, one or more of the VMs can be nested. i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM may include a guest operating system 232 and one or more guest applications 234. The guest operating system is a master control program of the respective VM and, among other things, the guest operating system forms a software platform on top of which the guest applications run. Guest applications are individual programs such as, for example, an email manager or a system logger.

Similar to any other computer system connected to the network 102, the VMs 220-1, 220-2 . . . 220-L are able to communicate with other computer systems connected to the network using the network interface 228 of the host computer 200. In addition, the VMs are able to access the datastore cluster 104 using the storage interface 226 of the host computer.

Turning back to FIG. 1, each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the clients running on the host computers, for example, virtual machines (VMs), in the respective cluster. The monitored configurations may include the hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include the size of each of the clients, virtualized hardware configurations for each of the clients, such as virtual CPU type and virtual memory size, software configurations for each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the respective cluster management server.

The cluster management servers 110 may also perform various operations to manage the clients and the host computers H-1, H-2 . . . H-M in their respective clusters. As illustrated in FIG. 1, in an embodiment, each cluster management server includes the resource management module (RMM) 112, which can be enabled by a user, to perform resource allocations and load balancing in the respective cluster. The resource management module operates to allocate available resources among clients running in the cluster based on a number of parameters, which may include predefined rules and priorities. The resource management module may be configured to select an appropriate host computer in the cluster when a new client is added to the cluster, to assign applications running on clients to an appropriate datastore, and to power down particular clients and/or host computers in the cluster to conserve power. Additionally or alternatively, the RMM may be programmed to perform other operations to manage the cluster.

In some embodiments, the cluster management servers 110 may be implemented on separate physical computers. In other embodiments, the cluster management servers may be implemented as software programs running on the host computer 200 shown in FIG. 2, or virtual computers, such as the 220-1, 220-2 . . . 220-L. In an implementation, the cluster management servers are VMware VCENTER servers with at least some of the features available for such servers and the resource management modules 112 in the cluster management servers are VMware Distributed Resource Schedulers, which provide a Distributed Resource Scheduler (DRS) service as is known in the field.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The datastore cluster 104 is used to store data for the host computers of the clusters C-1. C-2 . . . C-N, which can be accessed like any other type of storage device commonly connected to computer systems. In an embodiment, the datastore cluster can be accessed by entities, such as clients running on the host computers, using any file system, e.g., virtual machine file system (VMFS) or network file system (NFS). The datastore cluster includes one or more computer data storage devices 116, which can be any type of storage devices, such as solid-stare devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The datastore cluster includes a storage management module 118, which manages the operation of the datastore cluster. In an embodiment, the storage management module is a computer program executing on one or more computer systems (not shown) of the datastore cluster. The datastore cluster supports multiple datastores DS-1, DS-2 . . . DS-X (where X is a positive integer), which may be identified using logical unit numbers (LUNs). In an embodiment, the datastores are virtualized representations of storage facilities. Thus, each datastore may use resources from more than one of the storage devices included in the datastore cluster. The datastores are used to store data associated with the clients supported by the host computers of the clusters C-1, C-2 . . . C-N. For virtual machines, the datastores may be used as virtual storage or virtual disks to store files needed by the virtual machines for operation. One or more datastores may be associated with one or more clusters. In, an embodiment, the same datastore may be associated with more than one cluster.

Figure 3A:
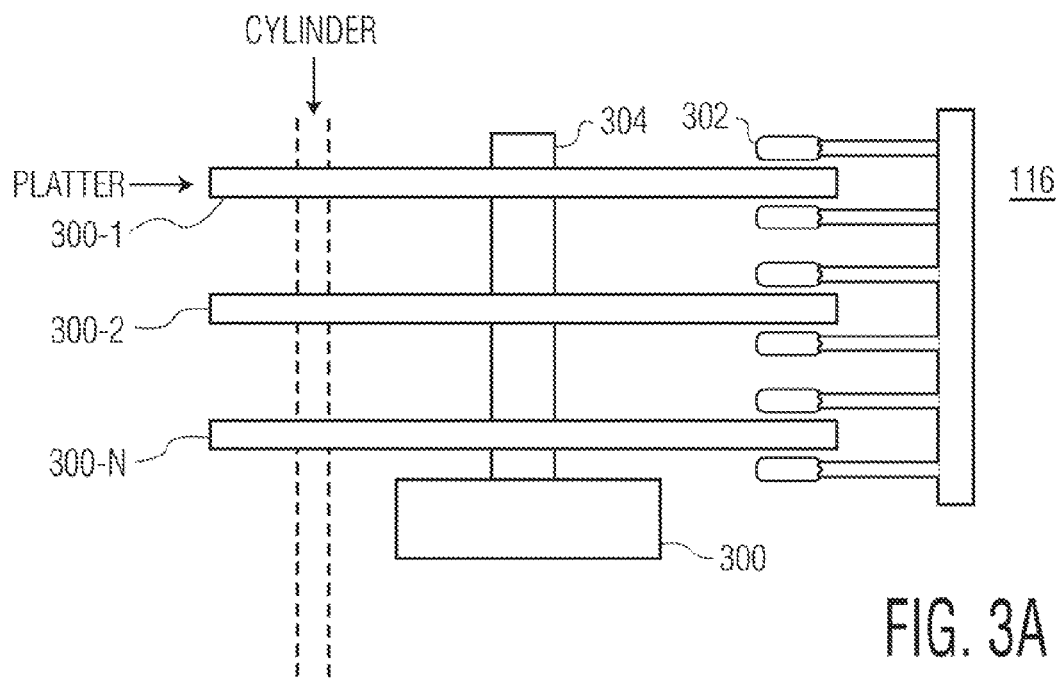
FIG. 3A is a side view of a disk drive storage device.
Figure 3B:
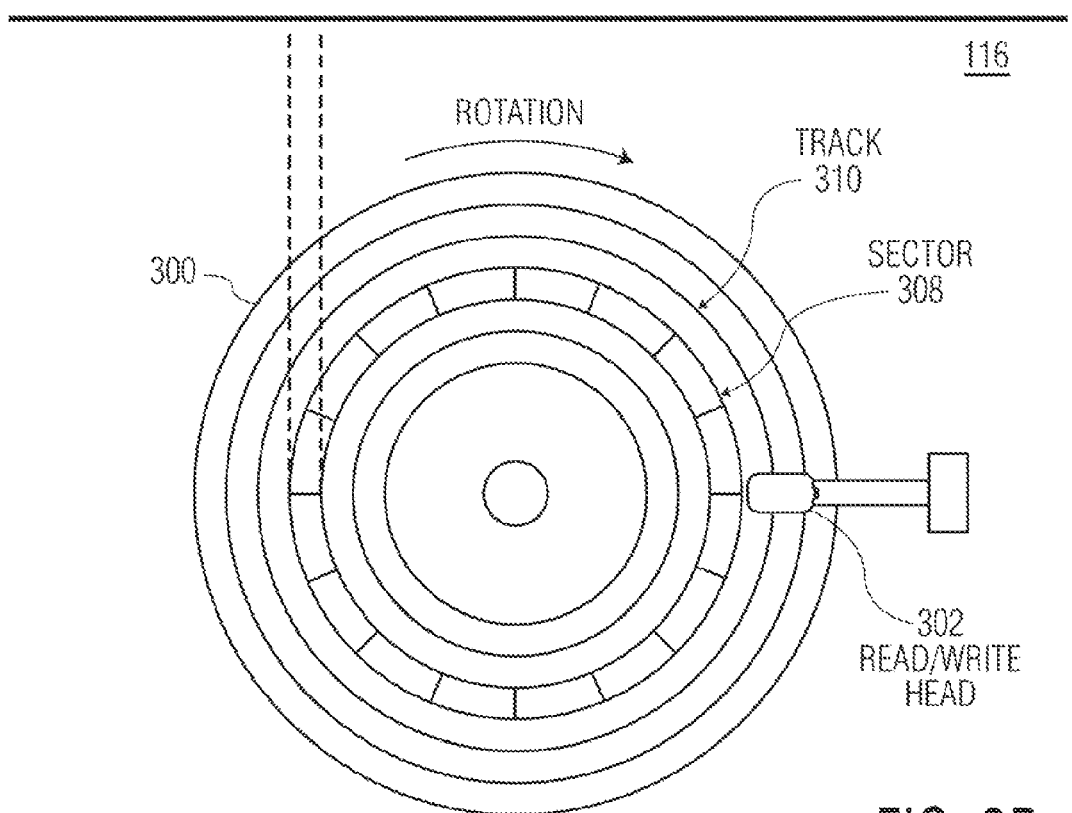
FIG. 3B is a top view of the disk drive storage device of FIG. 3A.

Turning now to FIGS. 3A and 3B, FIG. 3A is a side view of a typical disk drive storage device 116 that includes three platters which are equally spaced, although more platters could be used in other embodiments. The platters are all centrally connected to a spindle 304 which is rotated in a single direction by an electric motor 306 thus rotating the platters in unison. Between the platters, and located on both sides of each platter, are read/write heads 302.

FIG. 3B is a top view of the disk drive storage device of FIG. 3A. Each platter 300 has a top and bottom surface on which data can be written or from which data can be read. Data is stored in multiple sectors 308 located on multiple tracks 309. When data is written to or read from these sectors 308, the read/write heads 302 move in unison toward and away from the spindle on each side of the platter 300. In the example shown in FIGS. 3A and 3B, the dotted lines indicate a cylinder that corresponds to sectors of three different platters. In order to read or write a file, the disks must be rotated and the read/write heads must be moved to each sector where relevant file data is either written or to be written. The rate at which the disks can be rotated and the read/write heads moved affects the rate at which data can be read or written (throughput). Throughput is calculated by the number of input-output operations per second (IOps) multiplied by the size of the I/O (e.g., number of blocks). In an embodiment, data is stored using one of two I/O data access techniques: random I/O, in which data is stored in multiple sectors 308 located across several tracks and platters, or in sequential I/O, in which data is stored in successive sectors located along a single track. In the case of random I/O, the I/O size can be relatively small (e.g., one block of data per operation). In the case of sequential I/O, the I/O size is, on average, relatively large (e.g., 100 blocks of data per operation). Since sequential I/O apps (i.e., applications using a sequential I/O data access technique) typically have a larger I/O size and thus a larger throughput, comingling random I/O apps (i.e., applications using a random I/O data access technique) with sequential I/O apps can reduce the performance of the comingled sequential I/O apps because a smaller I/O size may be used to accommodate the random I/O apps. Thus, comingling of applications that utilize random and sequential I/O data access techniques on the same datastore can reduce the maximum throughput for both random I/O apps and sequential I/O apps on the datastore.

Figure 4A:
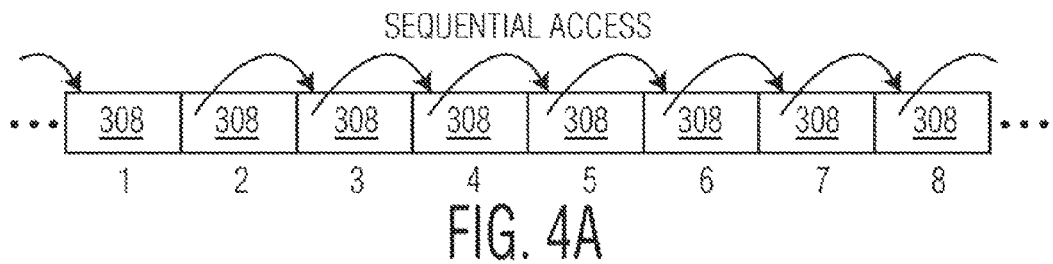
FIG. 4A illustrates a sequential I/O data access pattern.
Figure 4B:
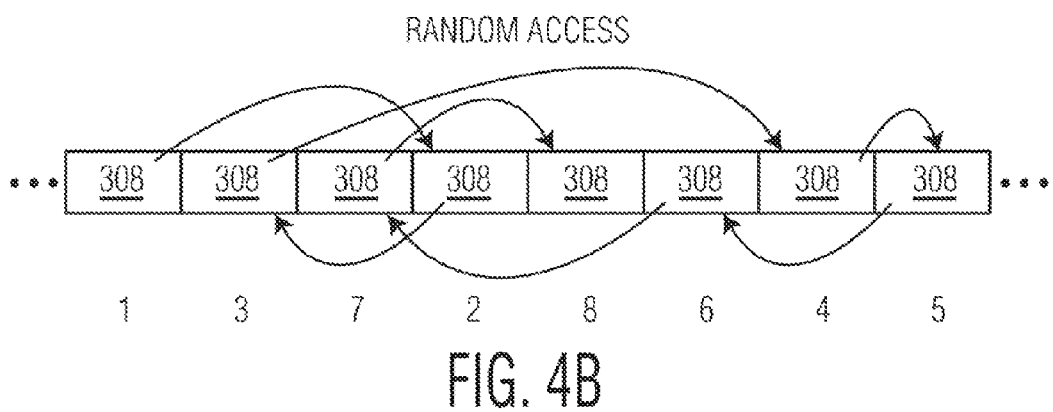
FIG. 4B illustrates a random I/O data access pattern.

FIGS. 4A and 4B illustrate sequential and random I/O data access techniques, respectively. In both figures, all sectors are accessed from within the same track 309. As shown in FIG. 4A, if the I/O data access technique is sequential, then each successive access is performed at a physically successive sector. Referring back to FIG. 3B, while the read/write head 302 does not need to move to implement the access, the disk needs to rotate the distance required to enable reading of each successive sector, but does not need to rotate to the end of the track to reach the next sector. If the I/O data access technique is random, as shown in FIG. 4B, then each successive access is performed at a randomly located sector. For example, FIG. 4B shows that the second access is at a sector located three sectors to the right of the initial sector and the third access is at a sector located two sectors to the left of second access. Referring back to FIG. 3B, the read/write head 302 would not move to implement the access, but the disk needs to rotate between sector 1 and sector 2 and then rotate back around in the single direction to reach sector 3. This additional rotation introduces delay into the read/write operations that can negatively impact the performance of a cluster of VMs. When both sequential I/O and random I/O data access techniques are utilized on the same disk, the sequential I/O operations can experience the same delay as if the I/O data access technique were random because operations utilizing a random I/O data access technique may interrupt the sequential rotation of the disk as well as limit the amount of continuous sectors available for sequential access. However, if sequential I/O apps and random I/O apps are segregated onto different datastores, then the performance of sequential I/O operations is not impacted by random I/O operations.

In accordance with an embodiment of the invention, applications exhibiting different I/O data access patterns are assigned to datastores by collecting data related to the input-output operations performed by the applications, analyzing the collected data to identify corresponding data access patterns, and assigning applications to datastores based on the identified data access patterns. In this way, applications can be segregated by data access pattern onto separate datastores. For example, random I/O apps and sequential I/O apps can be assigned to different datastores. Additionally, if random I/O apps are found to be comingled with sequential I/O apps on the same datastore, then data associated with the applications can be migrated as necessary to achieve segregation. In an embodiment, random I/O apps and sequential I/O apps are segregated onto datastores that rotate independent of each other.

In an embodiment, the segregation process is repeatedly performed and maintained without user interaction or input through the automated creation of rules that control the assignment of applications to datastores. Because the process is repeatedly performed, new rules can be automatically added as the virtual machine environment changes (e.g., computing resources are added or removed or applications are moved, added, or removed). Automation of the segregation process allows for large and dynamic virtual machine environments to be managed in a manner that would otherwise be impractical by manual user input.

Figure 5A:
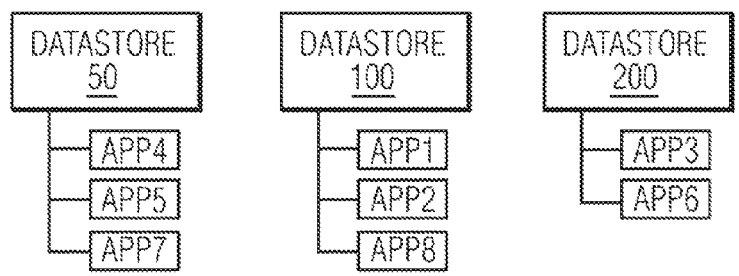
FIG. 5A illustrates applications distributed amongst a set of datastores.

An example implementation of the segregation process is now described with reference to FIGS. 5A through 5D. In FIGS. 5A through 5D, each block represents application data stored at the datastore to which the block is connected. For example, in FIG. 5A, the block identified as "APP4" represents data related to the execution of application 4 and that the data is stored on datastore 50. For description purposes, the three datastores depicted in FIGS. 5A-5D are identified as datastore 50, datastore 100, and datastore 200 and each datastore is independently rotatable. As shown in FIG. 5A, applications 4, 5, and 7 store data on datastore 50, applications 1, 2, and 8 store data on datastore 100, and applications 3 and 6 store data on datastore 200. Although numbered differently, application 4 and application 5 are two instances of the same application (e.g., the same database server application).

Figure 6A:
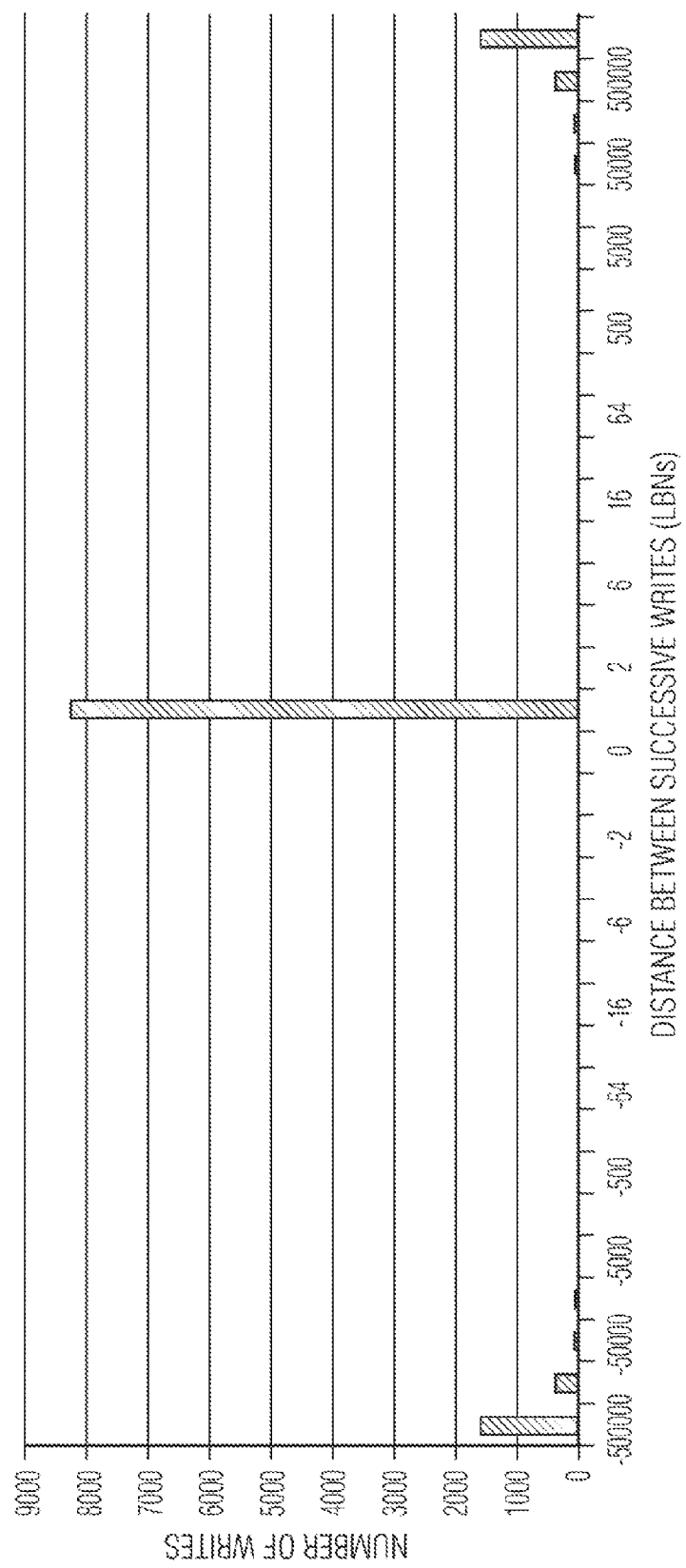
FIG. 6A is a histogram depicting seek distance data collected for a first application.
Figure 6B:
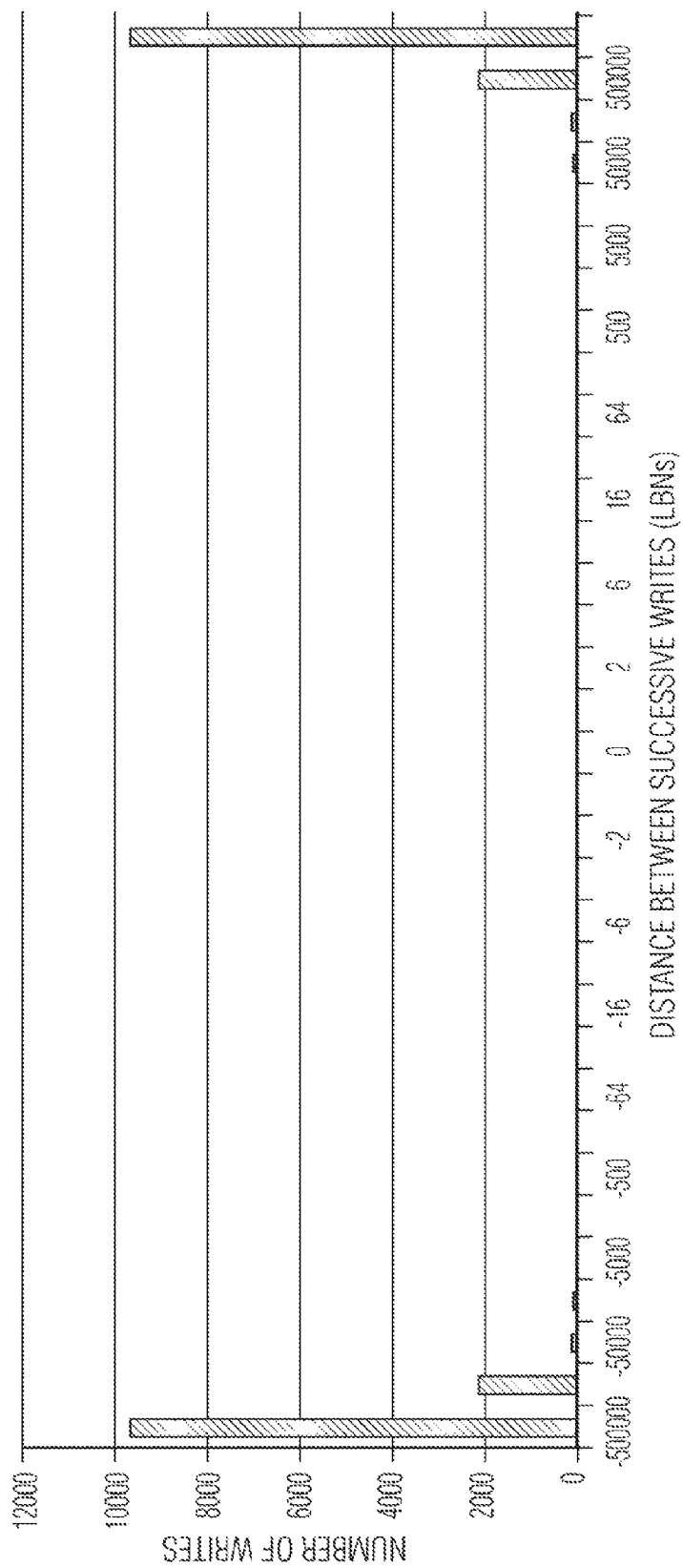
FIG. 6B is a histogram depicting seek distance data collected for a second application.

In a first operation in accordance with an embodiment of the invention, I/O operations data is collected for each of the applications shown in FIG. 5A during execution of the applications. In an embodiment, the collected I/O operations data includes information such as I/O lengths, seek distances (e.g., the incremental distance between logical block numbers (LBNs)), outstanding I/O requests, and latency and can be performed by a tool such as "vscsiStats," which is a software tool provided by VMware that is typically used for troubleshooting virtual machine storage performance and is capable of reporting I/O lengths, seek distances, outstanding I/O requests, and latency. Because the I/O operations data is collected during execution of the applications, the I/O data reflects the actual operating state of the applications in the virtual machine network. FIG. 6A is a histogram depicting seek distance data collected for a first application using, for example, vscsiStats. The histogram of FIG. 6A depicts a high number of successive write commands having a distance (in LBNs) of one between each command. FIG. 6B is a histogram depicting seek distance data collected for a second application using, for example, vscsiStats. The histogram of FIG. 6B depicts a high variation in the distance (in LBNs) between each successive write command.

Referring back to FIG. 5B, in a next operation, the I/O operation data is analyzed to identify the data access technique used by each application, FIG. 5B illustrates the same applications distributed amongst the datastores as in FIG. 5A, but after the collected data has been analyzed and the access pattern exhibited by each application has been identified. In an embodiment, the data collected is the seek distance (measured in LBNs) between each successive access command.

Figure 5B:
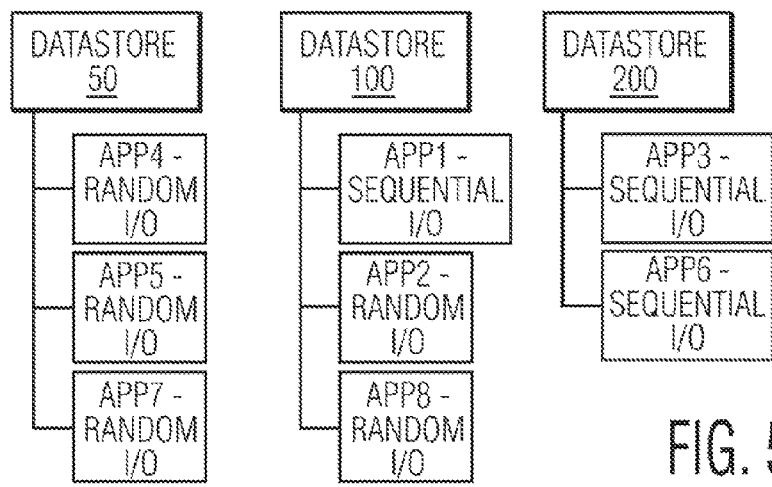
FIG. 5B illustrates the application distribution of FIG. 5A after data related to the I/O operations for each application has been analyzed.

Thus, if an application is executing a series of commands to read from, or write, to LBNs that are a fixed incremental distance apart (e.g., each subsequent command has a LBN that is one larger than the previous command), then the application exhibits a sequential I/O access pattern and the application is identified as using a sequential I/O data access technique. Alternatively, if an application is executing a series of commands to read or write from LBNs at random incremental distances, then the application exhibits a random I/O access pattern and the application is identified as using a random I/O data access technique. For example, the application associated with the data depicted in FIG. 6A would be identified as a sequential I/O app because the distance between successive writes appears to be a fixed incremental distance apart (i.e., one LBN) and the application associated with the data depicted in FIG. 6B would be identified as a random I/O app because the distance between successive writes appears to be random. Although the above embodiment is described in terms of seek distance, other information, could be used to identify the data access technique used by each application. As indicated in FIG. 5B, applications 1, 3, and 6 are identified as sequential I/O apps and applications 2, 4, 5, 7, and 8 are identified as random I/O apps. In an embodiment, once an application has been identified as either a random I/O app or a sequential I/O app, future instances of the same application can be similarly identified without analysis because identical applications will typically exhibit the same I/O data access pattern. In the embodiment of FIGS. 5A-5D, application 5 (which is the same application as application 4) is identified as a random I/O app based on the identification of application 4 as a random I/O app.

Figure 5C:
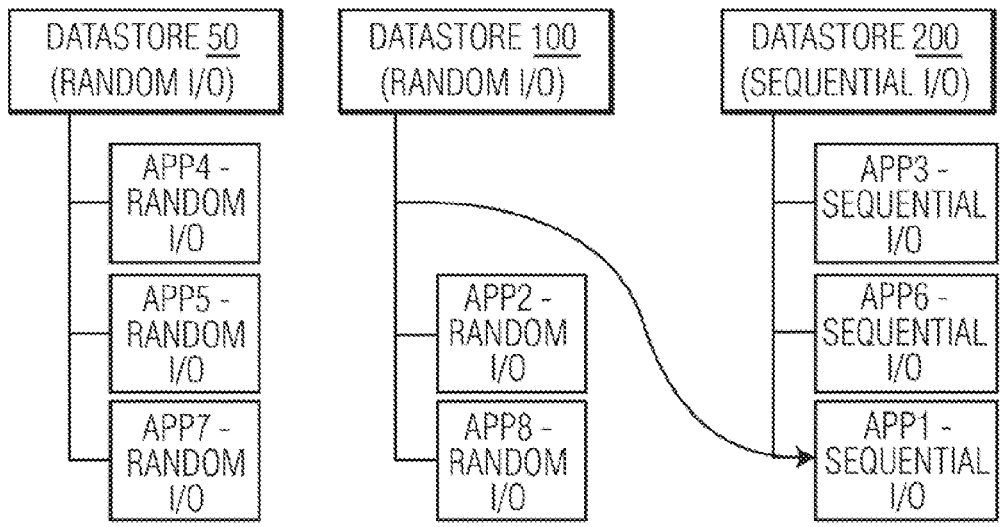
FIG. 5C illustrates the application distribution of FIG. 5B after the applications have been assigned to datastores.

With reference to FIG. 5C, in a next operation, the applications are assigned to the datastores based on the data access pattern that is exhibited by the respective application. In an embodiment, before applications are assigned to datastores, the distribution of the applications amongst the datastores is examined to determine if the current distribution provides information regarding efficient resource assignment decisions. Based on the current distribution of applications, it may be apparent that certain datastores should be designated to store sequential I/O apps and certain other datastores should be designated to store random I/O apps in order to efficiently manage computing resources. For example, datastores designated to store sequential I/O apps are dedicated to exclusive storage of sequential I/O apps (e.g., excluding the storage of random I/O apps) and datastores designated to store random I/O apps are dedicated to exclusive storage of random I/O apps (e.g., excluding the storage of sequential I/O apps). In an embodiment, designations are made in order to minimize the number of migrations that need to be performed to segregate the random I/O apps from the sequential I/O apps. As shown in FIG. 5C, all the applications on datastore 50 exhibit random I/O data access patterns and, therefore, datastore 50 is designated to exclusively store data related to random I/O apps. Similarly, datastore 200, having only applications exhibiting sequential I/O data access patterns, is designated to store data related to sequential I/O apps. However, as shown in FIG. 5B, datastore 100 stores data related to random I/O apps and sequential I/O apps. In an embodiment, datastore 100 is designated to store data related to either random I/O applications or sequential I/O applications based on, for example, the current distribution of applications in the datastore or the current designations of the datastores in the datastore cluster, although other criteria could be used to make such designations. As illustrated in FIG. 5C, datastore 100 is designated exclusively for applications exhibiting random I/O data access patterns and only a single migration (e.g., application 1 from datastore 100 to datastore 200) is needed to segregate all of the applications by data access pattern.

In an embodiment, application assignments and datastore designations are maintained by assignment rules. The assignment rules, in conjunction with the resource management module, can be used to guide the assignment and migration of applications to achieve and maintain segregation of related application data. The assignment rules can be defined as "affinity rules" in which applications can only be assigned to datastores with a matching data access pattern designation. The assignment rules can also be defined as "anti-affinity rules" in which applications cannot be assigned to particular datastores. For example, if an application is identified as exhibiting a random I/O data access pattern, then an anti-affinity rule could state that the application cannot be assigned to a datastore that is designated for applications that exhibit sequential I/O data access patterns.

In accordance with an embodiment of the invention, assignment rules are defined on the basis of the current distribution of applications amongst the datastores by access pattern. As illustrated in FIG. 5C, all applications currently assigned to datastore 50 exhibit random I/O data access patterns. In response, an assignment rule is defined that allows random I/O apps to be placed on datastore 50. A similar rule is created for datastore 100 and an assignment rule is created for datastore 200 that allows sequential I/O apps to be placed on datastore 200.

In an embodiment, if an application is assigned to a datastore that is different from the datastore to which the application is currently assigned, the application data can be migrated to the application's assigned datastore. In conformity with the assignment rules discussed above with reference to FIG. 5C, application 1 is re-assigned to datastore 200 from datastore 100 because application 1 is a sequential I/O app and datastore 200 is the only datastore designated to store the data of sequential I/O apps. Because application 1 is not currently storing its data on datastore 200, its data is migrated off of datastore 100 to datastore 200. The current assignments of all the other applications satisfy the assignment rules.

In a dynamic virtual machine environment, new applications can be put into operation at any time and the new applications must be assigned to a datastore. In an embodiment, new applications are assigned to datastores based on the exhibited data access pattern as described above with respect to FIGS. 5A through 5C. For example, I/O operations data is collected for a new application and the data access pattern is identified from the data. The new application is then assigned to a datastore based on the identified data access pattern and the application of any assignment rules.

Figure 5D:
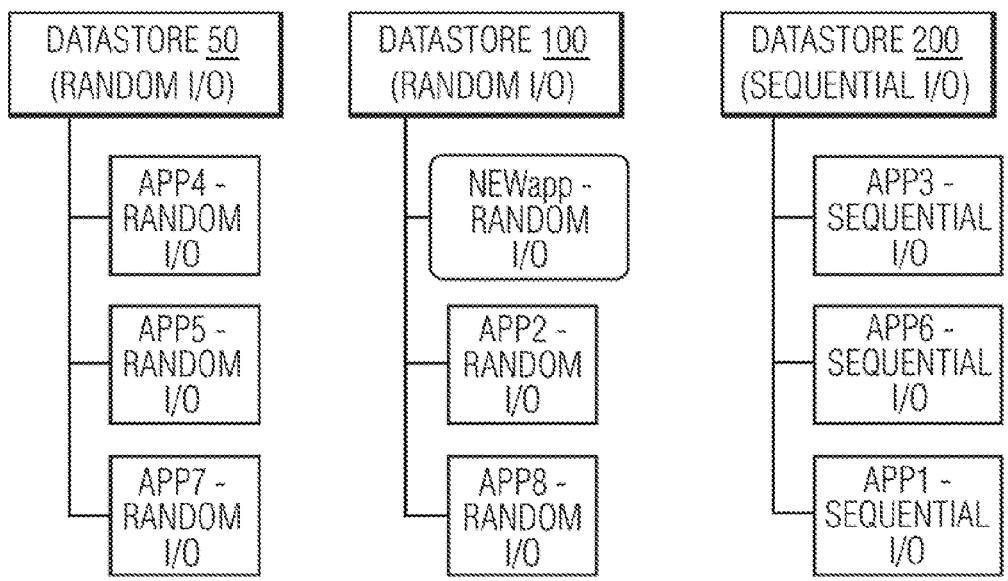
FIG. 5D illustrates the assignment of a new application.

With reference to FIG. 5D, a new application is identified as a random I/O app either by collecting I/O operations data and analyzing the data or by identifying the application as an application that exhibits a previously identified access pattern. Because the new application is identified as a random I/O app, the new application should not be assigned to datastore 200, but could be assigned to datastore 50 or datastore 100. As illustrated in FIG. 5D, the new application is assigned to datastore 100. Again, this application assignment satisfies the assign ent rules.

Figure 7:
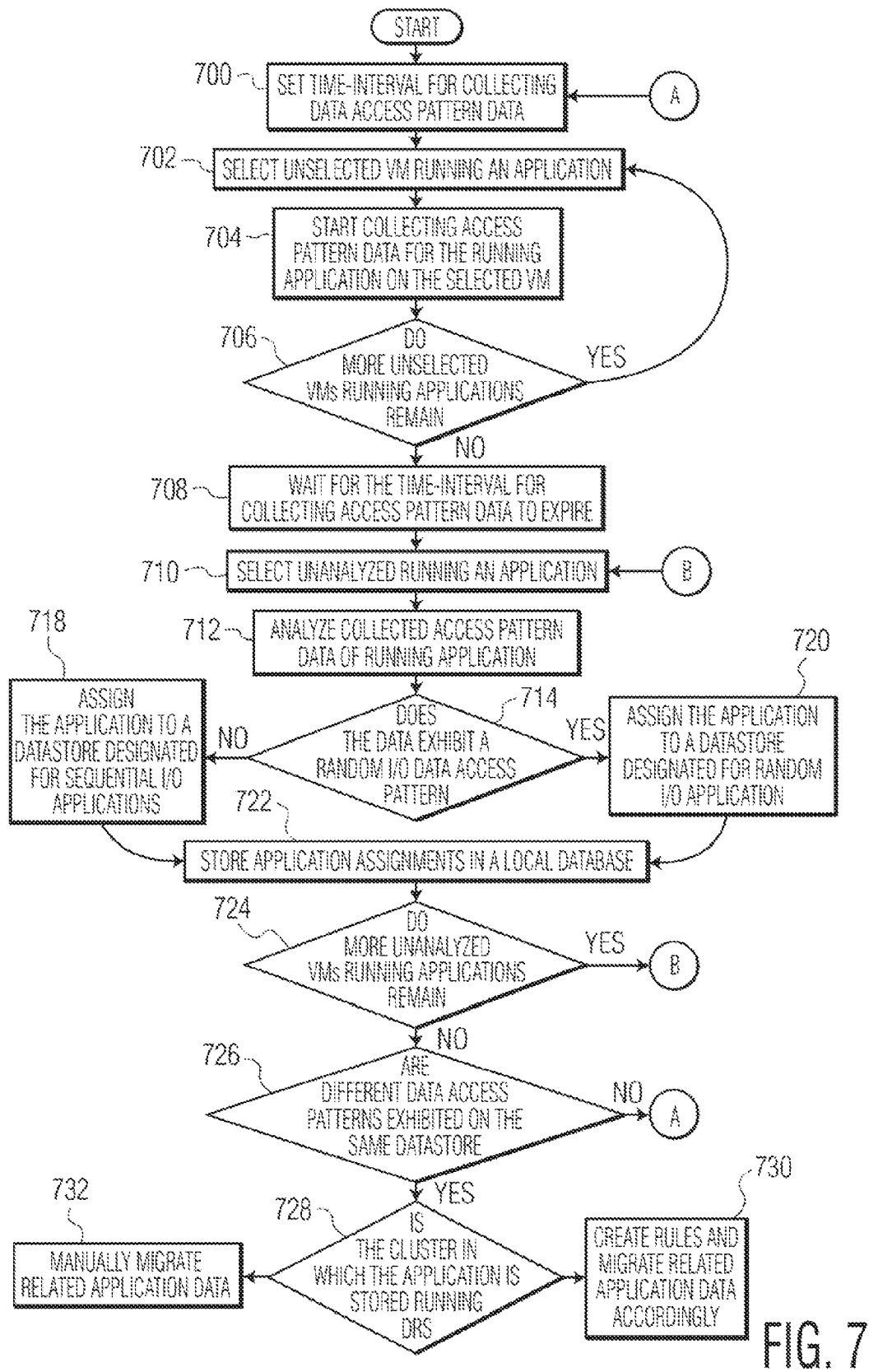
FIG. 7 is a flow diagram of a method for assigning applications to datastores in a virtual machine environment based on corresponding data access patterns in accordance with an embodiment of the invention.

In an embodiment, the collection of I/O operations data, analysis of the I/O operations data, identification of data access types, creation of rules, and migration of applications is performed as illustrated in the flow diagram in FIG. 7. FIG. 7 is a flow diagram of a computer implemented method for assigning applications to datastores in a virtual machine environment based on corresponding data access patterns. In an embodiment, the method is closed-looped in that the method is implemented by an entity such as a cluster management server without user intervention or involvement. For example, the cluster management server can automatically implement the assignment process without active input from a network administrator.

At block 700, a time interval over which data access pattern data will be collected is set. At block 702, a first unselected VM running an application is selected and at block 704 the collection of access pattern data is started on the selected VM for the running application. If, at decision point 706, an unselected VM is determined to remain in the cluster, then the next VM is selected and the collection of access pattern data is started on the next VM for the next application as well. In an embodiment, the collection of access pattern data is started on all VMs running in the cluster.

At block 708, once the collection of access pattern data has been started for all VMs running in the cluster, the collection is allowed to run for the time-interval previously set in block 700. At the expiration of the set time-interval, at block 710, the first unanalyzed running VM is selected and, at block 712, the collected data is analyzed. If at decision point 714, the collected data indicates that the application running on the selected VM exhibits a random I/O data, access pattern, then, at block 720, the VM, and thus the application running on the VM, will be assigned to a datastore that has been designated for random I/O applications. Otherwise, at block 718, the application will be assigned to a datastore designated for sequential I/O applications, in an embodiment, the designation process is facilitated by the creation of assignment rules as discussed above with respect to FIG. 5C. For example, the assignment at block 720 can be facilitated by the creation of an affinity rule between the selected VM and a datastore designated for random I/O applications while several anti-affinity rules are created between the VM and all datastores designated for sequential I/O applications. Similarly, the assignment at block 718 can be facilitated by the creation of an affinity rule between the selected VM and a datastore designated for sequential I/O applications while several anti-affinity rules are created between the VM and all datastores designated for random I/O applications.

After an application has been assigned to a datastore, at block 722, the assignment is stored in a local database for future retrieval. At decision point 724, if an unanalyzed VM running an application is determined to remain in the cluster, then the next unanalyzed VM is selected, the collected data for the application running on the selected VM is analyzed, and the VM and application are assigned as well.

Once all desired applications and their corresponding VMs have been assigned to datastores, at decision point 726, it is determined whether different data access patterns are being exhibited on the same datastore. If different data access patterns are not exhibited on the same datastore, then segregation has been achieved. If there are different data access patterns exhibited on the same datastore then, at decision point 728, it is determined if the cluster is running DRS. If the cluster is running DRS, then, at block 730, assignment rules are created and related application data is migrated accordingly. If the cluster is not running DRS, then, at block 732, the related application data is manually migrated. After assignment rules are created or related application data is manually migrated, the datastores will be successfully segregated.

In an embodiment, the collection of I/O operations data, analysis of the I/O operations data, identification of data access types, creation of rules, and migration of applications can be performed again after a predefined interval. This predefined interval can be set in many ways including, for example, by the user (e.g., user sets the process to execute every day at 1 A.M.), by a count-down clock (e.g., the process executes once every 24 hours), or by an event trigger (e.g., the process executes every time a new application is added).

Figure 8:
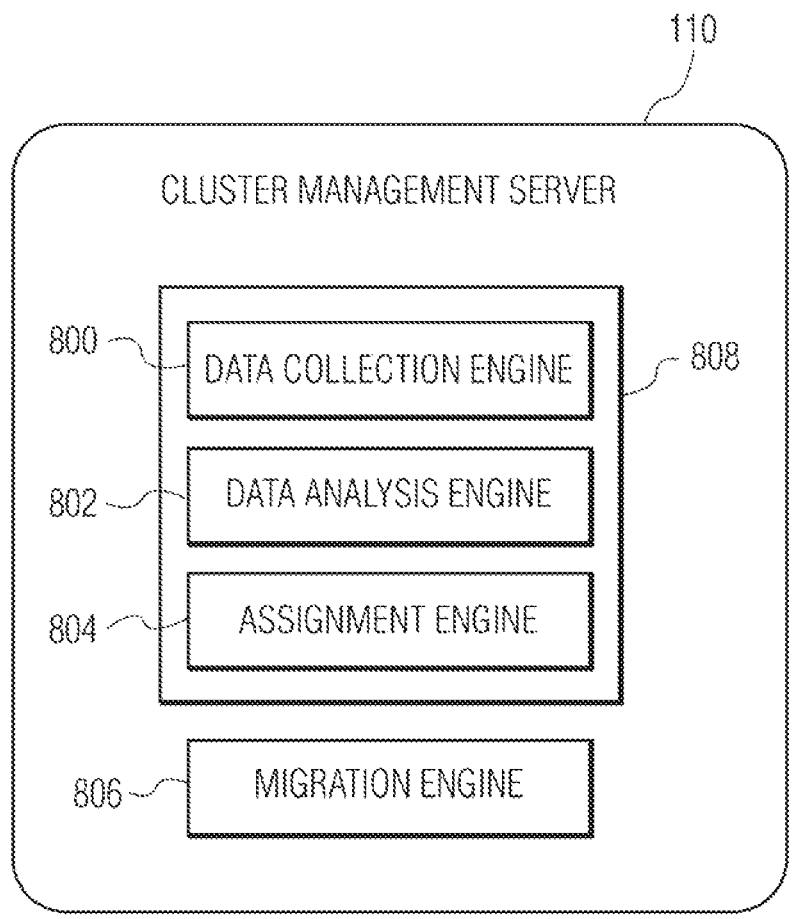
FIG. 8 is a block diagram of a cluster management system in accordance with an embodiment of the invention.

In an embodiment, a cluster management server is configured with a segregation module to implement the data collection, analysis, assignment, and migration as described above. FIG. 8 is a block diagram of an embodiment of a cluster management server 110 (FIG. 1) that includes a segregation engine 808 and a data migration engine 806, in which the segregation engine 808 includes a data collection engine 800, a data analysis engine 802, and an assignment engine 804. The data collection engine 800 collects data related to I/O operations for multiple different applications during execution of the multiple different applications. Once the data is collected, the data is used by the data analysis engine 802 to identify data access patterns for the multiple different applications. The assignment engine 804 then assigns the applications to datastores based on the data access pattern that corresponds to each of the different applications. If any applications need to be migrated as discussed above with reference to FIG. 5C, the migration engine 806 will facilitate the migration of the application to a new datastore.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory computer-readable storage medium comprising instructions that, when executed in a computing device, cause the computing device to carry out steps for assigning applications to datastores in a virtual machine environment, the steps comprising:
collecting data related to input-output operations for multiple different applications during execution of the multiple different applications;
analyzing the input-output operations data for the multiple different applications to identify data access patterns for the multiple different applications by:
identifying applications whose input-output seek distances correspond to fixed incremental changes in seek distance as sequential I/O apps; and
identifying applications whose input-output seek distances correspond to random incremental changes in seek distance as random I/O apps; and
assigning applications identified as sequential I/O apps to a datastore designated for sequential I/O apps;
assigning applications identified as random I/O apps to a datastore designated for random I/O apps; and
migrating data associated with the multiple different applications to datastores in a manner that segregates the data by data access pattern;
wherein, the data associated with the multiple different applications is migrated according to assignment rules, wherein the assignment rules define how applications should be assigned to the datastores in order to maintain the data segregation; and
wherein the collecting, analyzing, and assigning is repeated at a predefined interval in a closed-loop management system.

2. The non-transitory computer-readable storage medium of claim 1, wherein assigning applications to datastores comprises:
identifying a distribution of the multiple different applications amongst the datastores by access pattern; and
assigning the multiple different applications to the datastores in response to the access pattern distribution amongst the datastores.

3. The non-transitory computer-readable storage medium of claim 1, wherein assigning applications to datastores comprises:
identifying a distribution of the multiple different applications amongst the datastores by access pattern; and
designating datastores as being exclusive to the particular access pattern identified for the majority of applications utilizing each datastore.

4. A method for assigning applications to datastores in a virtual machine environment, the method comprising:
collecting data related to input-output operations for multiple different applications during execution of the multiple different applications;
analyzing the input-output operations data for the multiple different applications to identify data access patterns for the multiple different applications by:
identifying applications whose input-output seek distances correspond to fixed incremental changes in seek distance as sequential I/O apps; and
identifying applications whose input-output seek distances correspond to random incremental changes in seek distance as random I/O apps; and
assigning applications identified as sequential I/O apps to a datastore designated for sequential I/O apps;
assigning applications identified as random I/O apps to a datastore designated for random I/O apps; and
migrating data associated with the multiple different applications to datastores in a manner that segregates the data by data access pattern;
wherein, the data associated with the multiple different applications is migrated according to assignment rules, wherein the assignment rules define how applications should be assigned to the datastores in order to maintain the data segregation; and
wherein the collecting, analyzing, and assigning is repeated at a predefined interval in a closed-loop management system.

5. The method of claim 4, wherein assigning applications to datastores comprises:
identifying a distribution of the multiple different applications amongst the datastores by access pattern; and
assigning the multiple different applications to the datastores in response to the access pattern distribution amongst the datastores.

6. The method of claim 4, wherein assigning applications to datastores comprises:
identifying a distribution of the multiple different applications amongst the datastores by access pattern;
designating datastores as being exclusive to the particular access pattern identified for the majority of applications utilizing each datastore.

7. A computer system comprising:
at least one processor and memory for managing host computers in a cluster, the at least one processor being configured to execute instructions stored in the memory to perform steps comprising:
collecting data related to input-output operations for multiple different applications during execution of the multiple different applications;
analyzing the input-output operations data for the multiple different applications to identify data access patterns for the multiple different applications by:
identifying applications whose input-output seek distances correspond to fixed incremental changes in seek distance as sequential I/O apps; and
identifying applications whose input-output seek distances correspond to random incremental changes in seek distance as random I/O apps; and
assigning applications identified as sequential I/O apps to a datastore designated for sequential I/O apps;
assigning applications identified as random I/O apps to a datastore designated for random I/O apps; and
migrating data associated with the multiple different applications to datastores in a manner that segregates the data by data access pattern; wherein, the data associated with the multiple different applications is migrated according to assignment rules, wherein the assignment rules define how applications should be assigned to the datastores in order to maintain the data segregation; and
wherein the collecting, analyzing, and assigning is repeated at a predefined interval in a closed-loop management system.

8. The computer system of claim 7, wherein assigning applications to datastores comprises:
identifying a distribution of the multiple different applications amongst the datastores by access pattern; and assigning the multiple different applications to the datastores in response to the access pattern distribution amongst the datastores.

9. The computer system of claim 7, wherein assigning applications to datastores comprises:
identifying a distribution of the multiple different applications amongst the datastores by access pattern;
designating datastores as being exclusive to the particular access pattern identified for the majority of applications utilizing each datastore.

* * * * *